May 12, 1959 B. S. PARMET 2,886,633
TELEVISION RECEIVER
Filed July 30, 1956
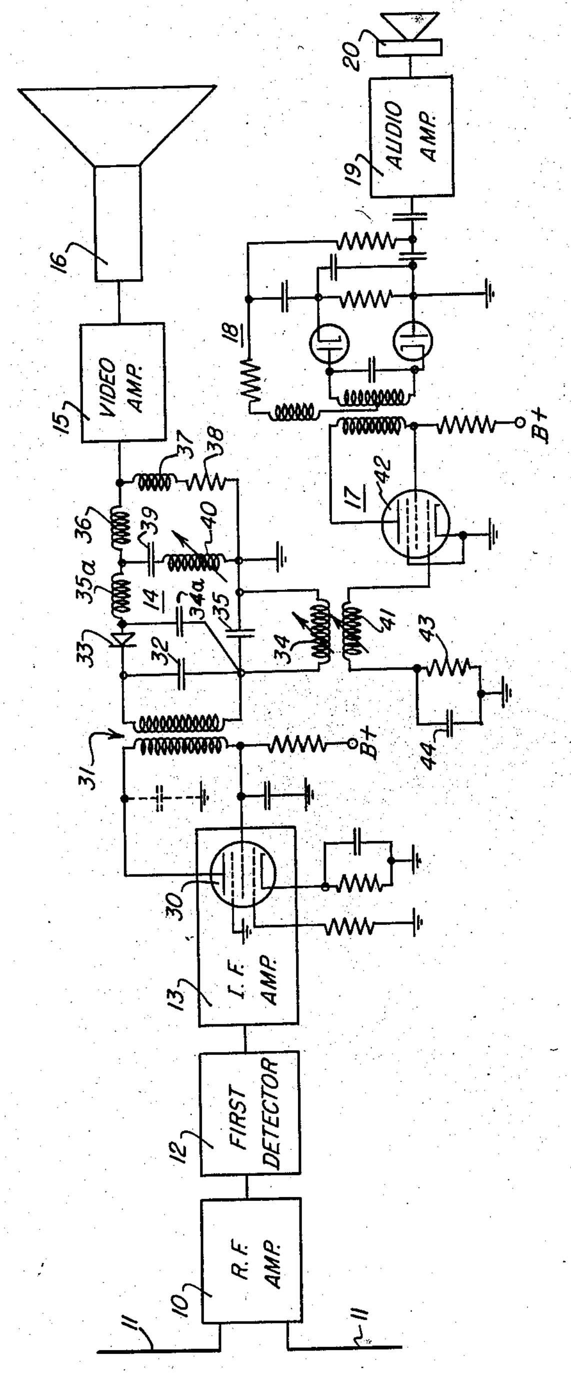
INVENTOR.
Bernard S. Parmet
BY Mueller & Aichele
Attys.

United States Patent Office 2,886,633

Patented May 12, 1959

2,886,633

TELEVISION RECEIVER

Bernard S. Parmet, Elmwood Park, Ill., assignor to Motorola, Inc., Chicago, Ill., a corporation of Illinois Application July 30, 1956, Serial No. 600,949

2 Claims. (Cl. 178—5.8)

The present invention relates to television receivers, and more particularly to an improved second detector circuit in a television receiver for detecting the picture and sound components of a received television signal and for transferring these detected components to their respective channels with optimum energy transfer efficiency.

Most present day television receivers operate on the intercarrier-sound principle. In accordance with this principle, the amplitude-modulated picture intermediate frequency carrier wave and the frequency-modulated sound intermediate frequency carrier wave form a common intermediate frequency amplifier in the receiver are fed to the second detector; and the second detector detects the picture wave to produce a composite video signal, and it also heterodynes the two waves together to produce an intercarrier-sound signal that is frequency modulated with the sound intelligence. The composite video signal is fed to the video or picture channel of the receiver and the intercarrier-sound signal is fed to the sound channel thereof.

Some difficulties have been experienced in the prior art in designing the second detector circuit so that the intercarrier-sound signal may be fed to the sound channel with optimum energy transfer. To accomplish this, it is necessary that there be an impedance match between the coupling circuit which couples the detector to the sound channel and the asymmetrical conductive rectifying device used in the second detector. However, the input impedance of the picture channel is usually high relative to the internal impedance of the rectifying device at the frequency of the intercarrier-sound signal, and as it is usual in the prior art receivers to couple the sound channel and the picture channel to the second detector at substantially the same point, it has proved difficult to devise a simple circuit which produces an impedance match between the sound channel and the rectifying device for maximum energy transfer of the intercarrier-sound signal to the sound channel.

It is, accordingly, an object of the present invention to provide an improved detector in a television receiver which is constructed in a simple and straightforward manner to enable the intercarrier-sound component of a received television signal to be transferred to the sound channel of the receiver with maximum efficiency and optimum energy transfer.

Another object of the invention is to provide such an improved detector circuit which produces efficient separation of the intercarrier-sound component from the picture components of the received television signal and attenuates the intercarrier-sound component before it reaches the picture channel of the receiver to reduce interference by the intercarrier-sound component to a minimum.

The above and other features of the invention which are believed to be new are set forth with particularity in the appended claims. The invention itself, however, together with further objects and advantages thereof, may best be understood by reference to the following description when taken in conjunction with the single drawing which shows a television receiver partly in block form and which is constructed to incorporate the present invention.

The detector circuit of the present invention is intended to be used in a television receiver of the superheterodyne type, which receiver includes a first detector and an intermediate frequency amplifier for producing in response to a received television signal an amplitude-modulated picture intermediate frequency carrier wave and a frequency-modulated sound intermediate frequency carrier wave, and which receiver also includes a sound channel and a picture channel. The detector of the invention detects the picture intermediate frequency carrier wave to produce a composite video signal for the picture channel, and it heterodynes the picture and sound intermediate frequency carrier waves to produce an intercarrier-sound signal for the sound channel. The second detector comprises an asymmetrical conductive device, an input circuit coupled to the intermediated frequency amplifier and having one side connected to the device, and a parallel-resonant circuit tuned to the frequency of the intercarrier-sound signal connecting the other side of said input circuit to a point of reference potential. The parallel-resonant circuit is coupled to the sound channel, and it is designed to have an impedance at the frequency of the intercarrier-sound signal that is essentially matched with the internal impedance of the asymmetrical conductive device so as to obtain optimum energy transfer to the sound channel at that frequency. Also, circuit means is provided for coupling the other side of the asymmetrical conductive device to the picture channel, and it includes a series resonant circuit tuned to the frequency of the intercarrier-sound signal and which is connected to the point of reference potential.

The television receiver illustrated in the drawing includes a radio frequency amplifier 10 of one or more stages, this amplifier having input terminals connected to a usual antenna 11 and output terminals connected through a first detector 12 to an intermediate frequency amplifier 13. The intermediate frequency amplifier is coupled to a second detector 14 which is constructed in accordance with the invention, and the second detector is coupled through a video amplifier 15 to the input electrodes of a cathode-ray image reproducer 16. The second detector is also coupled through a sound intermediate frequency amplifier 17, through a sound detector 18, and through an audio amplifier 19 to a sound reproducing device or speaker 20.

When the receiver is appropriately tuned, a television signal intercepted by the antenna 11 is amplified in radio frequency amplifier 10 and heterodyned to the selected intermediate frequency of the receiver in first detector 12. The resulting intermediate frequency signal includes an amplitude-modulated intermediate frequency picture carrier wave and a frequency-modulated intermediate frequency sound carrier wave. These two waves are amplified in intermediate frequency amplifier 13, and they are detected in the second detector 14. The second detector detects the picture intermediate frequency carrier wave to produce a composite video signal which is amplified in video amplifier 15 and supplied to the input electrodes of image reproducer 16. The second detector 14 also heterodynes the picture and sound intermediate frequency carrier waves to produce an intercarrier-sound signal having a selected frequency and which is frequency modulated by the sound intelligence. This intercarrier-sound signal is amplified in amplifier 17, and it is detected in the usual frequency-modulation discriminator-detector circuit 18. The resulting audio intelligence is amplified in audio amplifier 19, and is supplied to the sound reproducer 20.

The sweep system of the receiver forms no part of the present invention, and, for that reason, has not been shown.

The final stage of intermediate frequency amplifier 13 includes an electron discharge device 30 which is connected in known manner. Device 30 has an anode connected to the positive terminal B+ of a source of unidirectional potential through the primary winding of a coupling transformer 31. The secondary winding of transformer 31 is shunted by a capacitor 32 to form a tuned or resonant input circuit for second detector 14 that is tuned to the intermediate frequency of the receiver. The pass band of the input circuit is sufficiently broad to pass both the picture and sound carrier waves to the second detector. The second detector also includes an asymmetrical conductive rectifying device 33 such as a diode or crystal rectifier, and one side of the resonant input circuit is connected to this device. A parallel resonant circuit including an inductance coil 34 and a shunting capacitor 35 connects the other side of the resonant input circuit to a point of reference potential or ground. The junction of device 33 and coil 35 is coupled through filtering capacitor **34*a* to the junction of resonant circuit 34, 35 and the secondary winding of transformer 31. Capacitor 34*a*** is a "tweet" suppressor. This tends to increase detector efficiency and aids in maintaining a constant impedance into which the detector works.

The picture channel of the receiver is constituted by the video amplifier 15 and image reproducer 16, and the other side of the rectifying device 33 is connected to the input of video amplifier 15 through a pair of peaking coils **35*a* and 36. These coils constitute a part of a circuit means coupling the device 33 to the picture channel, and this circuit means also includes a shunt peaking coil 37 and load resistor 38 connected to the point of reference potential, so that the picture channel is effectively connected between the other side of rectifying device 33 and the point of reference potential. A series-resonant circuit, including a capacitor 39 and inductance coil 40, is connected between the common junction of coils 35*a* and 36 and the point of reference potential and can be considered part of the circuit means referred to above coupling device 33** to the picture channel. This series-resonant circuit is also tuned to the frequency of the intercarrier-sound signal.

The amplifier 17, the discriminator-detector 18, the audio amplifier 19 and the sound reproducer 20 constitute the sound channel of the receiver. An inductance means such as coil 41 couples the sound channel to the parallel resonant circuit 34, 35; and this inductance means is connected between the control grid of the discharge device 42 of amplifier 17 and through a shunt resistor-capacitor biasing circuit 43, 44 to the point of reference potential or ground. The inductance coil 41 is tuned by the distributed capacity of the circuit to constitute a double tuned coupling circuit with the resonant circuit 34, 35 for coupling the second detector 14 to the sound channel of the receiver.

The impedance of the resonant network 34, 35 at the frequency of the intercarrier-sound signal is matched with the internal impedance of rectifying device 33 so that maximum energy transfer occurs at this frequency to the sound channel of the receiver. At this frequency, the input impedance of the video channel is relatively high, and this channel is effectively in series with the resonant circuit 34, 35. To prevent undue attenuation of the intercarrier-sound signal, the video channel is effectively shunted by the series resonant circuit 39, 40 which functions as a low impedance path for the intercarrier-sound signal. Moreover the series-resonant circuit 39, 40 assures that no appreciable intercarrier-sound signal ever reaches the video channel which would result in cross-talk and similar interference.

With the improved and simple circuit of the present invention, the amplitude of the sound signal supplied to the sound channel was found to be increased over three-fold as compared with a typical prior receiver. Moreover, improved reduction of interference of the intercarrier-sound signal in the picture channel was achieved and without the requirement for sound traps in the picture channel due to the series-resonant trap circuit 39, 40 shunting the input of the picture channel.

In the present invention, the use of the series-resonant circuit 39, 40 across the video channel constitutes a low-impedance path for the intercarrier sound signal so that the impedance of circuit 34, 35 can be matched directly to the impedance of detector 33 for optimum energy transfer to the sound channel. This improved performance is actually achieved by a circuit that is less costly and less complicated than the less efficient circuits of the prior art.

The series-resonant circuit 39, 40 not only assists in enabling optimum sound transfer to the sound channel but, as previously noted, constitutes an efficient trap for the video channel which provides distinct advantages over prior art circuits in reducing cross modulation and providing improved video transient control.

I claim:

1. In a television receiver of the superheterodyne type which includes a first detector and an intermediate frequency amplifier for producing in response to a received television signal an amplitude-modulated intermediate frequency picture carrier wave and a frequency-modulated intermediate frequency sound carrier wave, and which further includes a sound channel and a picture channel for utilizing sound and picture information; a second detector for detecting the intermediate frequency carrier waves to produce a composite video signal for the picture channel and for heterodyning the intermediate frequency carrier waves to produce a frequency-modulated intercarrier-sound signal for the sound channel, said second detector including in combination, a diode, a tuned input circuit coupled to the intermediate frequency amplifier and having one side connected to one side of said diode, a parallel-resonant circuit tuned to the frequency of the intercarrier-sound signal connecting the other side of said input circuit to a point of reference potential, said parallel-resonant circuit having an impedance at the frequency of the intercarrier-sound signal essentially matched wtih the impedance of said diode, inductance means coupling the sound channel to said parallel-resonant circuit, circuit means for coupling the picture channel between the other side of said diode and said point of reference potential, and a series-resonant circuit tuned to the frequency of the intercarrier-sound signal connected between said circuit means and said point of reference potential to reduce coupling of the intercarrier-sound signal to the picture channel.

2. In a television receiver of the superheterodyne type which includes a first detector and an intermediate frequency amplifier for producing in response to a received television signal an amplitude-modulated intermediate frequency picture carrier wave and a frequency-modulated intermediate frequency sound carrier wave, and which further includes a sound channel and a picture channel for utilizing sound and picture information: a second detector circuit for detecting the intermediate frequency carrier wave to produce a composite video signal for the picture channel and for heterodyning the intermediate frequency carrier waves to produce a frequency-modulated intercarrier sound signal for the sound channel, said second detector including in combination, tuned circuit means connected to the intermediate frequency amplifier and having first and second terminals to provide the intermediate frequency carrier waves to said second detector circuit, an asymmetrical conductive device, a series tuned circuit, a parallel tuned circuit, said tuned circuits being tuned to the frequency of the intercarrier-sound signal, circuit means connecting said asymmetrical conductive device and said tuned circuits in series with said first and second terminals, means connecting said parallel tuned circuit to the sound channel and impedance means coupled across said series tuned circuit and connected to the picture channel.

References Cited in the file of this patent

UNITED STATES PATENTS 2,448,908 Parker ---------------- Sept. 7, 1948